Sept. 20, 1955         J. W. BAMFORD ET AL         2,718,149
                         DAMPING CONTROL Filed May 23, 1952                                 2 Sheets-Sheet 1

INVENTORS
JOHN W. BAMFORD,
ROBERT E. FREDERICKS
& ROBERT B. KEES

BY  Robert B. Harmon

ATTORNEY

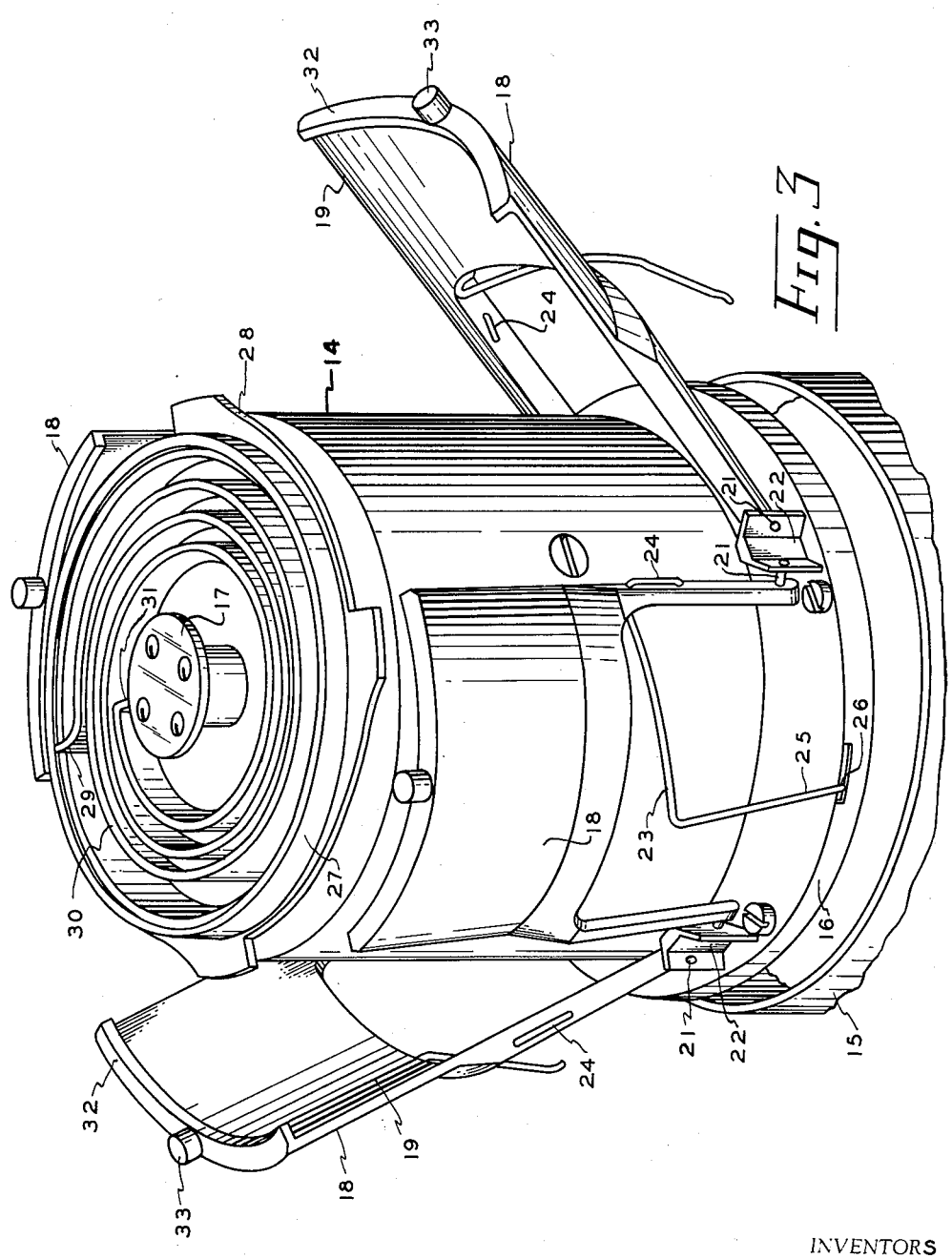

United States Patent Office 2,718,149
Patented Sept. 20, 1955

2,718,149

DAMPING CONTROL

John W. Bamford, Manhattan Beach, Robert E. Fredericks, Santa Monica, and Robert B. Kees, Pacific Palisades, Calif.

Application May 23, 1952, Serial No. 289,688

21 Claims. (Cl. 74—5.5)

This invention relates to a damping control for rotatable bodies.

The primary object of this invention is to provide an improved damping control for a rotatable body which is substantially constant in its effect on the body.

A more specific object of this invention is to provide an improved damping control for a rotatable body immersed in a fluid in which the effect of the control on the body is maintained substantially constant regardless of the effect of temperature changes on the viscosity of the fluid.

A further object of this invention is to provide a damping control for a rotatable body immersed in a fluid in which the viscous shear drag of the control on the body is maintained substantially constant by a thermal responsive element coacting with an eccentric to compensate for viscosity changes in the fluid under varying temperature conditions.

A more particular object of this invention is to provide a linear damping control for a rotatable body immersed in a fluid.

With the foregoing and other objects in view, the invention resides in the following specification and appended claims certain embodiments and details of construction of which are shown in the accompanying drawings, in which:

Figure 3 is an elevational view of the invention as utilized on a practical commercial unit.

Figure 1:
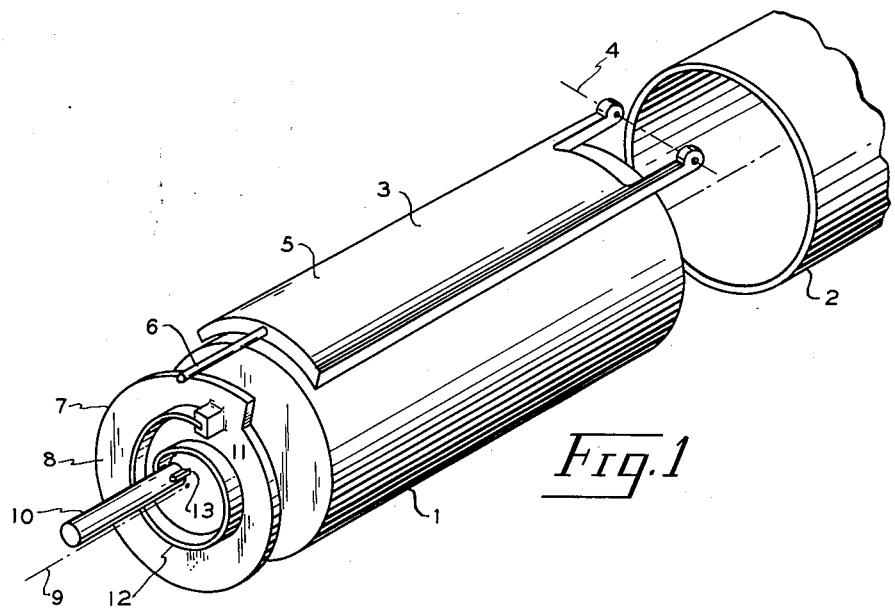
Figure 1 is a perspective view of the basic elements of the invention.

Referring now more particularly to Fig. 1, a rotatable body 1, constituting a member to be damped, as shown withdrawn from its casing 2. The casing is provided with confining end sections, not shown, and is filled with a suitable damping fluid, the character of which is not important here. A shroud 3 is pivotally connected to the casing end section (not shown in Fig. 1) about the axis 4. The rotatable body 1, as shown, has a cylindrical surface to which the arcuate surface 5 of the shroud 3 conforms. The end of shroud 3 is provided with a rigid follower arm 6 which engages the cam surface 7 of an eccentric 8. The eccentric 8 is mounted for free rotation about the axis of rotation 9 of the body 1. As shown in Fig. 1 the eccentric is shown freely carried on stationary spindle 10 which is suitably secured to the end section of the casing (not shown). Connected at one end to a projection 11 on the eccentric 8 is a thermal responsive element 12. The other end 13 of element 12 is secured to spindle 10 by any suitable means.

The type of thermal responsive element shown is a spirally wound bismetallic strip which will accurately respond to varying temperature conditions by tending to expand or contract as the case may be. It is immaterial whether the end 13 of element 12 is secured to the spindle, to a bearing supporting the body mounting the spindle (not shown in Fig. 1), or to a part of the casing end section. The important consideration is that the element be secured to the casing at one end and to the eccentric at the other end.

Figure 2:
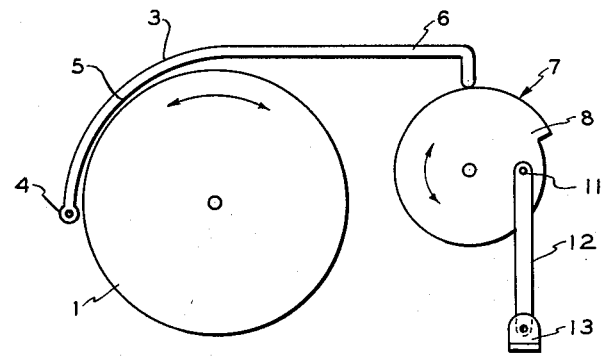
Figure 2 is a diagrammatic view of the elements of the invention for purposes of discussion.

The operation of the invention will be readily apparent when viewing Figs. 1 and 2. The surface 7 of eccentric 8 is predetermined to give a desired damping control of the body 1. The amount of damping to be effective on the body 1 is controlled by the spacing between the arcuate surface 5 of shroud 3 and the body 1 together with the damping fluid confined in said spacing. In order to compensate for the varying viscosity of the damping fluid under temperature changes, it is necessary that the spacing between the shroud and the body be varied. This variation in spacing is accomplished by the freely mounted eccentric 8 coacting with the thermal responsive element 12.

Thus in Fig. 2 upon an increase in temperature, which results in a decrease in fluid viscosity, it is necessary that the spacing between the shroud 3 and the body 1 be decreased to have the same predetermined shear drag or damping effect as prior to said temperature change. The thermal responsive element 12 will move the eccentric 8 clockwise and the follower arm 6 will ride down the cam surface 7 to reduce the spacing between the body 1 and the shroud 3 by permitting the shroud to pivot inwardly about its pivot axis 4. The reverse of this operation is effective upon decreases in temperature which tend to increase the viscosity of the fluid.

The construction of the shroud, the cam and the thermal responsive element and their placement within the casing 2 are a matter of choice, it only being essential that the three parts coact in response to temperature changes affecting the viscosity of the damping fluid to maintain a predetermined damping control on the body 1.

Referring now to Fig. 3 the damping control is shown as applied to a rate gyroscope as used in aircraft. The rotatable body to be damped is the gyro gimbal 14 which is cylindrical in form. Housed within said gimbal are the rotor and other parts of such gyroscopes, the construction of which forms no part of this invention. The gimbal 14 is carried in a fluid-filled casing 15, and is shown in Fig. 3 as withdrawn therefrom for purposes of clarity. The front end section of the casing is shown at 16 and carries a bearing (not shown) for supporting the pivot spindle at the forward end of gimbal 14 (also not shown). A similar bearing 17 is provided for attachment to the rear section of the casing (not shown) and this bearing supports the rear pivot spindle of the gimbal 14. Thus the gimbal 14 is mounted for free rotation within the fluid-filled casing 15.

In order to increase the utility and accuracy of rate gyroscopes, it is desirable to provide a damping control for such instruments which is unaffected by the changes in temperature to which aircraft are subjected. In Fig. 3 such a control is provided by elements similar to those in Figs. 1 and 2. A plurality of shrouds 18, having substantially arcuate surfaces 19, are pivotally secured to front casing section 16 by pivot pins 21 extending into pivot bosses 22 positioned about the inner surface of section 16.

A resilient element 23, which is preferably a stiff wire spring, is secured at one end to each shroud 18 at 24 by any suitable means and at the other end 25 to the end section 16 at 26. The purpose of the elements 23 is to bias the shrouds toward the gimbal 14. It is quite obvious that other resilient biasing elements having different designs and points of connection between the casing and the shrouds could be utilized. The important point is that the shrouds 18 be biased toward the rotatable body or gimbal 14 so that the coaction between biasing means and the automatic thermal responsive means to be described, may occur to vary the spacing between the shrouds and the body.

Mounted on the rear pivot spindle of gimbal 14 for free rotation thereon, is an eccentric 27 having a plurality of cam surfaces 28 all identical in character. Secured to the eccentric 27 at 29 by any suitable means is a spirally wound thermal responsive element 30. The inner end 31 of element 30 is connected by suitable means to the supporting bearing 17 which is secured to the rear casing section as previously described. Provided at the free extremities 32 of shrouds 18 are rigid follower arms 33 each of which engages a cam surface 28 when in operative position under the resilient action of biasing springs 23.

The operation of the unit of Fig. 3 is identical to that described for Figs. 1 and 2. The only difference resides in the structure of Fig. 3 where, due to a plurality of shrouds 18 a greater damping control may be exerted on gimbal 14 than were only the single shroud of Fig. 1 utilized.

This damping control is particularly effective in maintaining accurate instrument readings by aiding in the prevention of "overshooting" of an indicating needle and in preventing or substantially reducing the effect of vibrations on such indicating needles. The most desirable damping control for such instruments as rate gyroscopes is one which is linear in character. In the present invention it is seen that the shroud position is varied to compensate for changes in fluid viscosity to maintain a predetermined shear drag damping effect on the gimbal. Whether the damping is linear or not depends on the shape of the cam surfaces and a damping control other than linear in character under various temperature conditions may be obtained by providing any desirable cam surfaces on the eccentric.

The invention resides in the basic elements of the damping control and their coaction in obtaining an effective damping control of a rotatable body and not necessarily in their exact mode of construction and placement. It is readily foreseen that the exact structure as shown and described is adaptable to structural modifications.

We claim as our invention:

1. A damping control for a rotatable body immersed in a fluid-filled casing comprising a shroud pivotally connected to the casing and being biased to a position adjacent said rotatable body, a cam mounted for free rotation about the axis of the rotatable body, a follower arm extending from the free end of said shroud and engaging said cam, and thermal responsive means to move said cam and consequently the follower arm in response to temperature changes varying the viscosity of the fluid to thereby vary the position of the shroud relative to the rotatable body to maintain a predetermined damping effect on the rotatable body.

2. A damping control for a rotatable body immersed in a fluid filled casing comprising a plurality of shrouds pivotally connected to the casing and being biased to a position adjacent said rotatable body, an eccentric member, including a plurality of identical cam surfaces, mounted for free rotation about the axis of the rotatable body, a follower arm extending from the free end of each of said shrouds and engaging a cam surface of the eccentric member, and thermal responsive means to move said eccentric member and consequently the follower arms in response to temperature changes causing variations in the viscosity of the fluid to thereby vary the positions of the shrouds relative to the rotatable body to maintain a predetermined damping effect on the rotatable body.

3. A damping control for a rotatable body immersed in a fluid-filled casing comprising a shroud pivotally connected to the casing and being biased to a position adjacent said rotatable body, a spindle extending from said body and rigidly secured thereto, a casing mounted bearing for supporting said spindle, a cam mounted for free rotation on said spindle, a follower arm extending from the free end of said shroud and engaging said cam, and thermal responsive means connected between said bearing and said cam to move said cam and consequently the follower arm in response to temperature changes affecting the viscosity of the fluid to thereby vary the position of the shroud relative to the rotatable body to maintain a predetermined damping effect on the rotatable body.

4. A damping control for a rotatable body immersed in a fluid-filled casing comprising a shroud pivotally connected to the casing and being biased to a position adjacent said rotatable body, a spindle extending from said body and rigidly secured thereto, a casing mounted bearing for supporting said spindle, a cam mounted for free rotation on said spindle, a follower arm extending from the free end of said shroud and engaging said cam, and a spiral thermostatic element connected at its inner end to the bearing and at its outer end to said cam to move said cam and consequently the follower arm in response to temperature changes affecting the viscosity of the fluid to thereby vary the position of the shroud relative to the rotatable body to maintain a predetermined damping effect on the rotatable body.

5. A damping control for a rotatable body immersed in a fluid-filled casing comprising a plurality of shrouds pivotally connected to the casing and being biased to a position adjacent said rotatable body, a spindle extending from said body and rigidly secured thereto, a casing mounted bearing for supporting said spindle, an eccentric member including a plurality of identical cam surfaces mounted for free rotation on said spindle, a follower arm extending from the free end of each of said shrouds and engaging a cam surface of the eccentric member, and thermal responsive means connected between said bearing and said eccentric member to move said member and consequently the follower arms in response to temperature changes affecting the viscosity of the fluid to thereby vary the positions of the shrouds relative to the rotatable body to maintain a predetermined damping effect on the rotatable body.

6. A damping control for a rotatable body immersed in a fluid-filled casing comprising a plurality of shrouds pivotally connected to the casing and being biased to a position adjacent said rotatable body, a spindle extending from said body and rigidly secured thereto, a casing mounted bearing for supporting said spindle, an eccentric member including a plurality of identical cam surfaces, mounted for free rotation on said spindle, a follower arm extending from the free end of each of said shrouds and engaging a cam surface on the eccentric member, and a spiral thermostatic element connected at its inner end to the bearing and at its outer end to said eccentric member to move said member and consequently the follower arms in response to temperature changes affecting the viscosity of the fluid to thereby vary the positions of the shrouds relative to the rotatable body to maintain a predetermined damping effect on the rotatable body.

7. A damping control for a rotatable body immersed in a fluid-filled casing comprising a shroud pivotally connected to the casing and positioned adjacent said rotatable body, a spindle extending from said body and rigidly secured thereto, a casing mounted bearing supporting said spindle, a cam mounted for free rotation on said spindle, a follower arm extending from the free end of said shroud and engaging said cam, resilient means positioned between said casing and said shroud to maintain the engagement of said follower arm with said cam, and thermal responsive means connected between said bearing and said cam to move said cam and consequently the follower arm against the action of said resilient means in response to temperature changes affecting the viscosity of the fluid to thereby vary the position of the shroud relative to the rotatable body to maintain a predetermined damping effect on the rotatable body.

8. A damping control for a rotatable body immersed in a fluid-filled casing comprising a plurality of shrouds pivotally connected to one end of said casing and positioned adjacent said rotatable body, an axial spindle extending from said body and rigidly secured thereto, a casing mounted bearing supporting said spindle, an eccentric having a plurality of cam surfaces mounted for free rotation on said spindle, a follower arm extending from the free end of each of said shrouds, each of said arms engaging one of said cam surfaces, resilient means positioned between said casing and said shroud to maintain the engagement between said arms and said cam surfaces, and thermal responsive means connected between said bearing and said eccentric to move said eccentric and consequently the follower arms against the action of said resilient means in response to temperature changes affecting the viscosity of the fluid to thereby vary the positions of the shrouds relative to the rotatable body to maintain a predetermined damping effect on the rotatable body.

9. A damping control for a rotatable body immersed in a fluid-filled casing comprising a shroud pivotally connected to the casing and being biased to a position adjacent said rotatable body, a spindle extending from said body and rigidly secured thereto, a casing mounted bearing for supporting said spindle, a cam mounted for free rotation on said spindle, a follower arm extending from the free end of said shroud and engaging said cam, and thermal responsive means connected between the casing and said cam to move said cam and consequently the follower arm in response to temperature changes affecting the viscosity of the fluid to thereby vary the position of the shroud relative to the rotatable body to maintain a predetermined damping effect on the rotatable body.

10. A damping control for a rotatable body immersed in a fluid-filled casing comprising a shroud pivotally connected to the casing and being biased to a position adjacent said rotatable body, a spindle extending from said body and rigidly secured thereto, a casing mounted bearing for supporting said spindle, a cam mounted for free rotation on said spindle, a follower arm extending from the free end of said shroud and engaging said cam, and a spiral thermostatic element connected at its inner end to the casing and at its outer end to said cam to move said cam and consequently the follower arm in response to temperature changes affecting the viscosity of the fluid to thereby vary the position of the shroud relative to the rotatable body to maintain a predetermined damping effect on the rotatable body.

11. A damping control for a rotatable body immersed in a fluid-filled casing comprising a plurality of shrouds pivotally connected to the casing and being biased to a position adjacent said rotatable body, a spindle extending from said body and rigidly secured thereto, a casing mounted bearing for supporting said spindle, an eccentric with a plurality of cam surfaces mounted for free rotation on said spindle, a follower arm extending from the free end of each of said shrouds, each arm engaging one of said cam surfaces of the eccentric, and thermal responsive means connected between the casing and said eccentric to move said eccentric about the spindle and consequently the follower arms in response to temperature changes affecting the viscosity of the fluid to thereby vary the positions of the shrouds relative to the rotatable body to maintain a predetermined damping effect on the rotatable body.

12. A damping control for a rotatable body immersed in a fluid-filled casing comprising a plurality of shrouds pivotally connected to the casing and positioned adjacent said rotatable body, a spindle extending from said body and rigidly secured thereto, a casing mounted bearing for supporting said spindle, an eccentric with a plurality of cam surfaces mounted for free rotation on said spindle, a follower arm extending from the free end of each of said shrouds, each arm engaging one of said cam surfaces of the eccentric, resilient means positioned between said shrouds and said casing to maintain the engagement of the follower arms on said cam surfaces, and thermal responsive means connected between the casing and said eccentric to move said eccentric about the spindle and consequently the follower arms in response to temperature changes affecting the viscosity of the fluid to thereby vary the positions of the shrouds relative to the rotatable body to maintain a predetermined damping effect on the rotatable body.

13. A damping control for a rotatable body immersed in a fluid-filled casing comprising a plurality of resiliently biased shrouds pivotally connected to the casing at one extreme thereof, said shrouds having their free ends positioned along but out of contact with the surface of said rotatable body, and means coacting between the other extreme of said casing and the free ends of said shrouds to vary the spacing between the shrouds and said body.

14. A damping control for a rotatable body immersed in a fluid-filled casing comprising a resiliently biased shroud pivotally connected to the casing at one extreme thereof, said shroud having its free end positioned along but out of contact with the surface of said rotatable body, and coacting eccentric and thermal responsive means positioned at the other extreme of the casing to vary the spacing between the shroud and said body.

15. A damping control for a rotatable body immersed in a fluid-filled casing comprising a plurality of resiliently biased shrouds pivotally connected to the casing at one extreme thereof, said shrouds having their free ends positioned along but out of contact with the surface of said rotatable body, and coacting eccentric and thermal responsive means positioned at the other extreme of the casing to vary the spacing between the shrouds and said body.

16. A damping control for a rotatable body immersed in a fluid-filled casing, said body having a cylindrical surface comprising a resiliently biased shroud pivotally connected to the casing at one extreme thereof, the free end of said shroud having an arcuate surface conforming to the cylindrical surface of the body and being positioned along but out of contact with said cylindrical surface, and means coacting between the casing and the free end of said shroud to vary the spacing between the arcuate surface of the shroud and the cylindrical surface of the body.

17. A damping control for a rate gyroscope including a rotatable gimbal, comprising a fluid-filled casing for housing said gimbal, at least one resiliently biased shroud pivotally secured to one extreme of the casing, the free end of said shroud having a surface conforming to the surface of the gimbal and being positioned along but out of contact with said gimbal, and means coacting between the casing and the free end of said shroud to vary the spacing between the gimbal and the shroud.

18. A damping control for a rotatable body immersed in a fluid filled casing comprising movable means connected to the casing and positioned adjacent said rotatable body, means connected between the casing and the movable means to bias said movable means toward said rotatable body, and means to automatically vary the position of the movable means in conjunction with said biasing means to compensate for changes in fluid viscosity to maintain a predetermined damping effect on the rotatable body.

19. A damping control for a rotatable body immersed in a fluid-filled casing comprising movable means connected to the casing and positioned adjacent said rotatable body, means connected between the casing and the movable means to bias said movable means toward said rotatable body, and thermal responsive means to automatically vary the position of said movable means in conjunction with said biasing means to compensate for changes in fluid viscosity to maintain a predetermined damping effect on the rotatable body.

20. A damping control for a rotatable body immersed in a fluid-filled casing comprising a shroud pivotally connected to the casing, said shroud having its free end positioned along but out of contact with the surface of the rotatable body; resilient means connected to the shroud and contacting the casing to bias the shroud toward the rotatable member; and means coacting with said biasing means between said free end of the shroud and the casing to automatically vary the spacing between the shroud and the rotatable body to maintain thereby a predetermined damping effect on the body.

21. A damping control for a rotatable body immersed in a fluid-filled casing comprising a shroud pivotally connected to the casing, said shroud having its free end positioned along but out of contact with the surface of the rotatable body, resilient means interconnected between the shroud and the casing to bias the shroud toward the rotatable member, and thermal responsive means coacting with said biasing means between said free end of the shroud and the casing to automatically vary the spacing between the shroud and the rotatable body to maintain thereby a predetermined damping effect on the body.

References Cited in the file of this patent

UNITED STATES PATENTS

| Number | Name | Date |
|---|---|---|
| 1,183,530 | Brennan | May 16, 1916 |
| 1,761,694 | Sweet | June 3, 1930 |
| 2,013,109 | Reynolds | Sept. 3, 1935 |
| 2,080,279 | Kellogg | May 11, 1937 |
| 2,084,561 | Prescott et al. | June 23, 1937 |
| 2,159,235 | Tyler et al. | May 23, 1939 |
| 2,198,403 | Canady | Apr. 23, 1940 |
| 2,291,612 | Draper | Aug. 4, 1942 |
| 2,514,140 | O'Connor | July 4, 1950 |
| 2,584,222 | O'Connor | Feb. 5, 1952 |